W. MOORES.
SEED-PLANTER.
No. 193,268. Patented July 17, 1877.
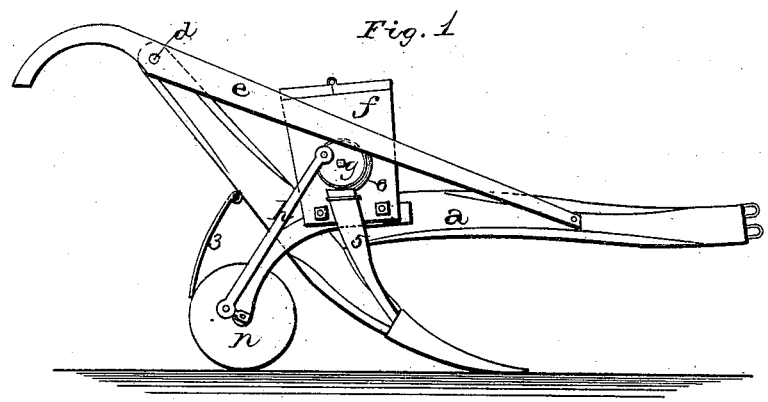
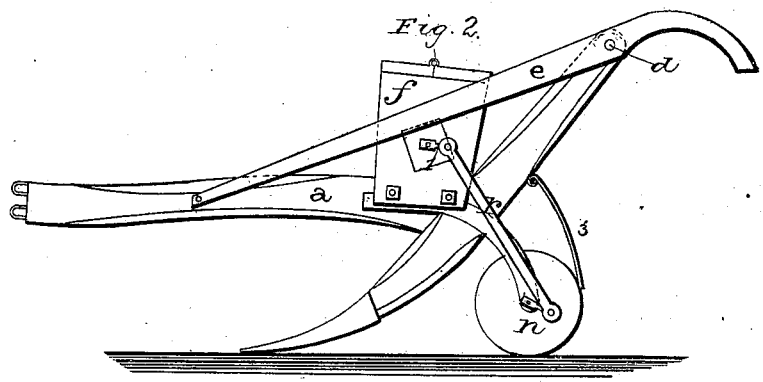
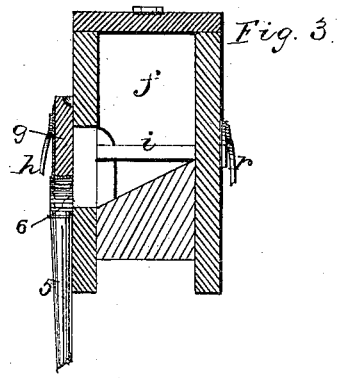
WITNESSES
INVENTOR

UNITED STATES PATENT OFFICE.

WREN MOORES, OF SHERBURNE, KENTUCKY.

IMPROVEMENT IN SEED-PLANTERS.

Specification forming part of Letters Patent No. 193,268, dated July 17, 1877; application filed June 14, 1877.

*To all whom it may concern:*

Be it known that I, WREN MOORES, of Sherburne, in the county of Fleming and State of Kentucky, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in placing the dropping-plate upon the outside of the hopper, and operating it by means of a small wheel that runs in the furrow, and suitable connecting-rods, as will be more fully described hereinafter.

Figure 1 is a side elevation of my invention. Fig. 2 is a side elevation of the reverse side. Fig. 3 is a sectional detail view.

$a$ represents an ordinary cultivator or plow of any desired construction. The standard of the cultivator-tooth extends up above the rear end of the beam, and has its upper end attached to the brace $d$, which unites the two handles $e$ together. Upon the top of the rear end of the beam is placed the seed-box $f$, which may be of any desired shape, size, or construction. Upon the outside of this box is placed the dropping-plate $g$, which is rigidly secured to one end of the shaft $i$ that passes horizontally through the bottom of the seed-box. This dropping-plate has any suitable number of recesses made in its inner edge, and has a connecting-rod, $h$, pivoted to it near its outer edge. The lower end of this connecting-rod is pivoted to a crank on the end of the shaft of the small wheel $n$ that is journaled in the rear of the standard. Upon the other end of this shaft is a second crank, which is placed at right angles with the first one, and which also has a connecting-rod, $r$, pivoted to it. The upper end of this connecting-rod is pivoted to a crank, 1, that is formed on the opposite end of the shaft $i$ from the feed-plate. Thus it will be seen that a connecting-rod extends from each side of the driving-wheel, so as to apply power at each end of the shaft $i$, and thereby cause it to revolve without any undue strain upon it. This shaft $i$, revolving in the bottom of the seed-box, will act as a stirrer to prevent the seed from becoming clogged together. Hinged or pivoted to the rear side of the standard is a scraper, 3, which keeps the rim of the wheel always free from dirt.

The bottom of the seed-box being made inclined, and having an opening through the side of the box, the seed runs down through this opening and rests against the side of the feed-plate. As the plate revolves the holes in the inner edge of the plate become filled, and the seeds are carried around until they are brought just over the mouth of the seed-spout 5, when they fall into it and are conducted down into the furrow made by the cultivator-tooth. The guard or rim 6, that is placed around a portion of the feed-plate, prevents the seeds from dropping out of the seed-holes until they are brought just over the top of the tube.

By locating the seed-plate upon the outside of the hopper, not only can the operator always see whether the seed is being dropped properly or not, but the plate is always where it can be repaired, in case of accident, without having to take any portion of the planter apart, besides cheapening the construction of the planter, and making the operating parts much simpler.

Having thus fully described my invention, I claim—

In a walking seed-planter, the combination of seed-box $f$, having an opening through its side, and an inclined bottom leading to the said hole, seed-plate $g$, shield 6, shaft $i$, connecting-rods $h$ $r$, driving-wheel $n$, and seed-spout 5, substantially as shown and described.

In testimony that I claim the foregoing I have hereunto set my hand this 8th day of June, 1877.

WREN MOORES.

Witnesses:
JOHN A. DAUGHERTY,
ELISHA SAUNDERS.